(12) United States Patent  
Wright, Jr. et al.

(10) Patent No.: US 9,684,989 B2
(45) Date of Patent: Jun. 20, 2017

(54) USER INTERFACE TRANSITION BETWEEN CAMERA VIEW AND MAP VIEW

(75) Inventors: Gerald V. Wright, Jr., Solana Beach, CA (US); Joel Simbulan Bernarte, Encinitas, CA (US); Virginia Walker Keating, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 293 days.

(21) Appl. No.: 12/816,955

(22) Filed: Jun. 16, 2010

(65) Prior Publication Data

US 2011/0310087 A1 Dec. 22, 2011

(51) Int. Cl.
*G06T 19/00* (2011.01)
*G06T 13/80* (2011.01)
*H04W 4/02* (2009.01)

(52) U.S. Cl.
CPC ............ *G06T 13/80* (2013.01); *G06T 19/003* (2013.01); *G06T 19/006* (2013.01); *H04W 4/02* (2013.01)

(58) Field of Classification Search
None
See application file for complete search history.

(56) References Cited

U.S. PATENT DOCUMENTS

| 6,272,431 B1 | 8/2001 | Zamojdo et al. |
| 2007/0162942 A1 | 7/2007 | Hamynen et al. |
| 2009/0096867 A1* | 4/2009 | Skjelten et al. ............. 348/113 |
| 2010/0123737 A1* | 5/2010 | Williamson et al. ......... 345/672 |
| 2010/0328344 A1* | 12/2010 | Mattila et al. ............... 345/633 |
| 2011/0187723 A1* | 8/2011 | Chen et al. .................. 345/473 |

(Continued)

FOREIGN PATENT DOCUMENTS

| CN | 101194143 A | 6/2008 |
| CN | 101379369 A | 3/2009 |
| EP | 2194508 A1 | 6/2010 |

(Continued)

OTHER PUBLICATIONS

"Going out: Robust Mode-based Tracking for Outdoor Augmented Reality", http://mi.eng.cam.ac.uk/~gr281/outdoortracking.html, 5 pages, downloaded Jan. 18, 2010.

(Continued)

*Primary Examiner* — Ryan D McCulley
(74) *Attorney, Agent, or Firm* — Pamela K. Soggu

(57) ABSTRACT

A user interface transition between a camera view and a map view displayed on a mobile platform is provided so as present a clear visual connection between the orientation in the camera view and the orientation in the map view. The user interface transition may be in response to a request to change from the camera view to the map view or vice-versa. Augmentation overlays for the camera view and map view may be produced based on, e.g., the line of sight of the camera or identifiable environmental characteristics visible in the camera view and the map view. One or more different augmentation overlays are also produced and displayed to provide the visual connection between the camera view and map view augmentation overlays. For example, a plurality of augmentation overlays may be displayed consecutively to clearly illustrate the changes between the camera view and map view augmentation overlays.

36 Claims, 13 Drawing Sheets

(56) References Cited

U.S. PATENT DOCUMENTS

2011/0279478 A1* 11/2011 Bitra .......................... 345/633

FOREIGN PATENT DOCUMENTS

| JP | 2008542746 A | 11/2008 |
|---|---|---|
| JP | 2009516189 A | 4/2009 |
| JP | 2009199572 A | 9/2009 |
| WO | 2005121707 A2 | 12/2005 |
| WO | WO2006132522 A1 | 12/2006 |
| WO | WO2011063282 | 5/2011 |

OTHER PUBLICATIONS

Fukatsu S et al., "Intuitive Control of Bird's Eye Overview Images for Navigation in an Enourmous Virtual Environment", Virtual Reality Software and Technology Proceedings of the ACM Symposium on Virtual Reality Software and Technology, Taipei, Taiwan Nov. 2-5, 1998, ACM, US, Nov. 2, 1998 (Nov. 2, 1998), pp. 67-76, XP002575273, ISBN: 978-1-58113-019-5 abstract; figures 1-5,8,9,12.
International Search Report and Written Opinion—PCT/US2011/040760—ISA/EPO—Nov. 8, 2011.
None.

* cited by examiner

USER INTERFACE TRANSITION BETWEEN CAMERA VIEW AND MAP VIEW

BACKGROUND

A common means to determine the location of a device is to use a satellite position system (SPS), such as the well-known Global Positioning Satellite (GPS) system or Global Navigation Satellite System (GNSS), which employ a number of satellites that are in orbit around the Earth. Position measurements using SPS are based on measurements of propagation delay times of SPS signals broadcast from a number of orbiting satellites to an SPS receiver. Once the SPS receiver has measured the signal propagation delays for each satellite, the range to each satellite can be determined and precise navigation information including 3-dimensional position, velocity and time of day of the SPS receiver can then be determined using the measured ranges and the known locations of the satellites.

One of the first and most difficult steps in using a map is physically orienting oneself in the correct direction. Incorrect orientation results in initiating navigation in the wrong direction. While electronic mapping systems using SPS, for example, are useful in determining one's current location, users often have difficulty understanding the maps relevance to the user's orientation.

Electronic mapping systems currently aid orientation by aligning the map view with the direction that the user is facing, sometimes referred to as a heading-up view. With a heading-up view, the displayed map is rotated so that the user's direction or heading is always shown as upwards in the display, as opposed to the more conventional North-up view in which North is shown as upwards in the display. A heading-up view, however, requires the user to translate between the elements shown on the map (top view) and the elements in front of them (front view), which can difficult because the shapes of the elements do not generally match clearly. For example, the front face of a building as seen by the viewer may be considerably different than the shape of the building in top view, which may make identification difficult. Another orientation aid sometimes used, for example, when a North-up view is used, may be referred to as a pie-slice orientation element, which illustrates the likely view angle of the user by displaying a wedge in the direction that the device is facing. Similar to the heading-up view, however, users sometimes find it difficult to understand the relevance of the pie-slice orientation element to the user's actual view as it requires that the user to translate between the elements shown on the map (top view) and the elements in front of them (front view).

Orienting yourself in a camera view with augmented reality, however, is much easier as the camera shows exactly what the user is pointing at. Augmented reality combines real-world imagery with computer generated data, such as graphics or textual information. The augmented reality overlays can emphasize the user's actual target or target direction. Currently there is no way of leveraging the ease of orientation in the augmented reality camera view with the map view.

SUMMARY

A user interface transition between a camera view and a map view displayed on a mobile platform is provided so as present a clear visual connection between the orientation in the camera view and the orientation in the map view. The user interface transition may be in response to a request to change from the camera view to the map view or vice-versa. The user interface transition may be produced using augmentation overlays for the camera view and map view that identify, e.g., the line of sight of the camera or identifiable environmental characteristics visible in the camera view and the map view. One or more different augmentation overlays are also produced and displayed to provide the visual connection between the camera view and map view augmentation overlays. For example, a plurality of augmentation overlays may be displayed consecutively to clearly illustrate the changes between the camera view and map view augmentation overlays.

DETAILED DESCRIPTION

Figure 1:
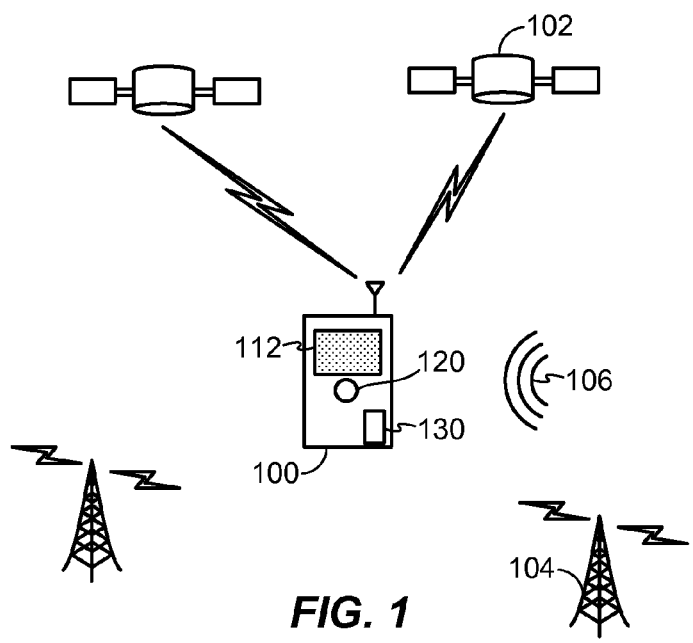
FIG. 1 illustrates a mobile platform that is capable of displaying a user interface transition between a camera view and a map view to provide a visual connection between the orientations of the two views.

FIG. 1 illustrates an example of a mobile platform 100 that is capable of displaying a user interface transition between a camera view and a map view to provide a visual connection between the orientations of the two views. In the camera view, a display 162 shows an image of the real-world environment, while in map view the display 162 shows a map that includes the position of the mobile platform 100. The mobile platform 100 displays a user interface transition between the two views with one or more frames showing the changes between the two views to provide a visual connection between an orientation in the camera view and an orientation in the map view. For example, augmentation overlays may be used to identify the user's orientation in the camera view and in the map view, e.g., by identifying environmental characteristics or a line of sight. The user interface transition may include one or more augmentation overlays illustrating the change between the augmentation overlay for the camera view and the augmentation overlay for the map view. The user interface transition between the camera view and the map view provides a visual connection between the real world elements in the camera view and the elements in the map view that assists in clearly informing the user of the user's orientation in the map view.

The mobile platform 100 may be used for navigation based on, e.g., determining its latitude and longitude using signals from a satellite positioning system (SPS), which includes satellite vehicles 102, or any other appropriate source for determining position including cellular towers 104 or wireless communication access points 106 or visual localization techniques. The mobile platform 100 includes a camera 120 to generate images of the physical real-world environment, as well orientation sensors 130, such as a digital compass, accelerometers or gyroscopes, that can be used to determine the orientation of the mobile platform 100.

As used herein, a mobile platform refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile platform" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile platform" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile platform."

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs) 102, illustrated in FIG. 1. For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass).

In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The mobile platform 100 is not limited to use with an SPS for position determination, as position determination techniques described herein may be implemented in conjunction with various wireless communication networks, including cellular towers 104 and from wireless communication access points 106, such as a wireless wide area network (WWAN), a wireless local area network (WLAN), a wireless personal area network (WPAN), and so on, as well as other positioning techniques, such as visual localization. Further the mobile platform 100 may access online servers to obtain data, such as satellite images, using various wireless communication networks via cellular towers 104 and from wireless communication access points 106, or using satellite vehicles 102 if desired. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2"

(3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

Figure 2:
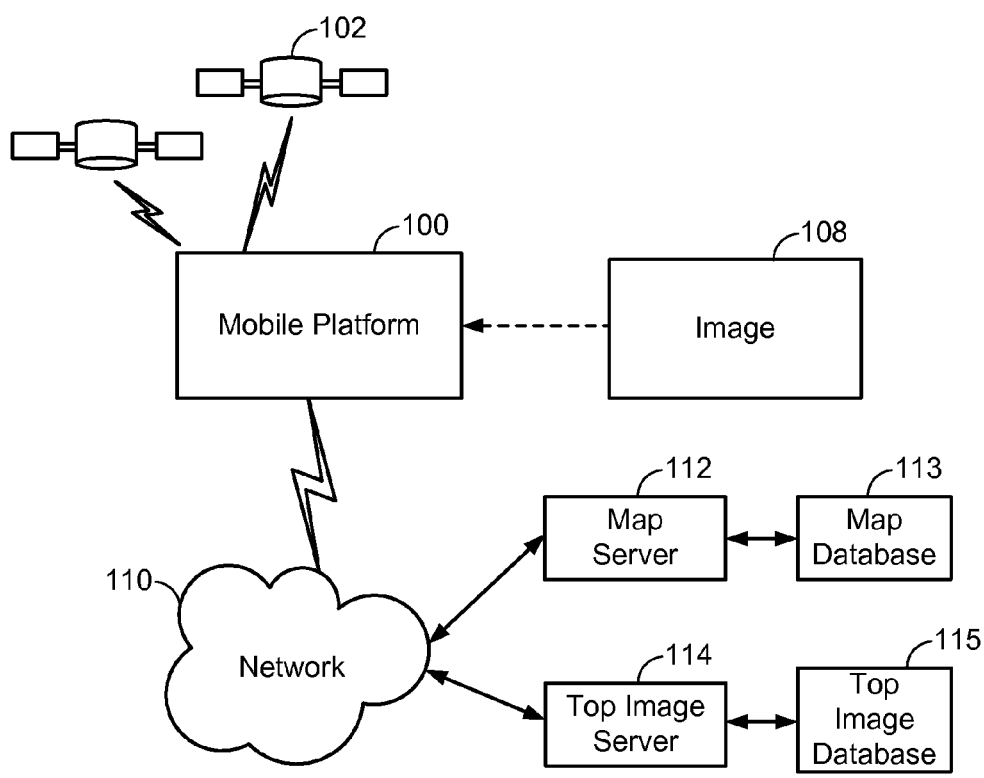
FIG. 2 illustrates a block diagram showing a system in which a mobile platform can provide a user interface transition between a camera view and a map view to provide a visual connection between the orientations of the two views.

FIG. 2 illustrates a block diagram showing a system in which a mobile platform 100 can provide a user interface transition between a camera view and a map view to provide a visual connection between the orientations of the two views. As illustrated, the mobile platform 100 captures an image 108 of the environment via camera 120, which may include a building, street or any type of visibly identifiable environmental characteristic. Additionally, the mobile platform 100 determines its position at the time the image 108 is produced, e.g., using satellite vehicles 102 in an SPS, wireless communication access points 106 (FIG. 1) or visual localization techniques. The mobile platform 100 may access a network 110, such as the Internet, e.g., via cellular tower 104 or wireless access point 106, illustrated in FIG. 1 to obtain a digital map of the mobile platform's position. The network 110 is coupled to a server 112, which is connected to a map database 114 that stores a digital map and a top image database 115 that stores digital top view image data, such as global satellite imagery based on Landsat 7 source data. The server may be, e.g., a dedicated server with a network connection. If desired, several different servers may be used. The mobile platform 100 may query the server 112 based on the position and orientation of the mobile platform 100 to obtain the map. In one embodiment, the mobile platform 100 may obtain a map of the mobile platform's position from local memory, e.g., when the mobile platform 100 stores a digital map in local memory. In this embodiment, the mobile platform 100 may access server 112 to update the locally stored map from time to time or when the mobile platform 100 leaves an area of coverage of a locally stored map.

The mobile platform 100 can display the captured image 108 from the camera 120 as the camera view on the display 162. The mobile platform 100 can also display the obtained map as the map view on the display 162. The mobile platform 100 further generates a user interface transition from the camera view to the map view or from the map view to the camera view, with one or more frames transitioning between the two views to provide a visual connection between an orientation in the camera view and an orientation in the map view. For example, the mobile platform 100 may use a first augmentation overlay that is displayed over the camera view, a second augmentation overlay that is displayed over the map view and a one or more different augmentation overlays that graphically illustrate the change from the first augmentation overlay to the second augmentation overlay (or vice versa) to clearly illustrate the direction that that the user is facing.

If desired, the mobile platform 100 may also obtain a top view image based on the position of the mobile station 100, e.g., from server 112 or stored in local memory, to obtain a top view image with sufficient resolution that identifiable environmental characteristics in the camera image 108 can be resolved. It should be understood that the top view image may be, e.g., a satellite image or an image produced via aerial photography. Moreover, it should be understood that the top view image may be an image from directly overhead or at an oblique angle, e.g., approximately 45°, which is sometime referred to as bird's eye view. The mobile platform 100 may then compare the camera image 108 to the top view image, e.g., obtained from server 112, to identify environmental characteristics and to prepare visual augmentation overlays for the environmental characteristics in the camera view and the top view image. The user interface transition illustrates the change in the augmentation overlays for the camera view and the top view when the mobile platform transitions between the camera view and the map view.

Figure 3:
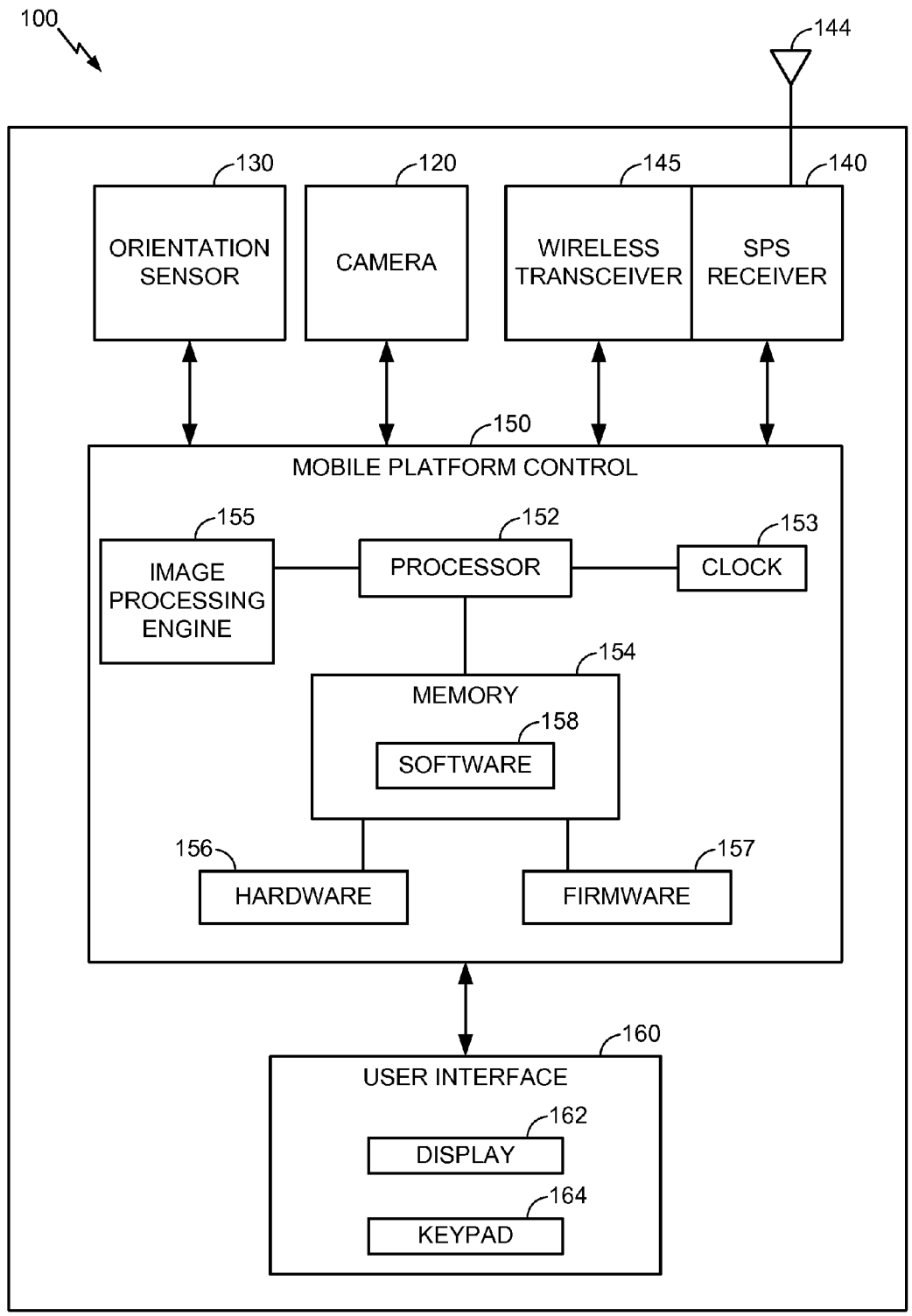
FIG. 3 is a block diagram of the mobile platform that may provide a user interface transition between the camera view and the map view.

FIG. 3 is a block diagram of the mobile platform 100 that may provide a user interface transition between the camera view and the map view to provide a visual connection between the two views for the user. The mobile platform includes a means for capturing an image, such as camera 120, which may produce still or moving images that are displayed by the mobile platform 100. The mobile platform 100 also includes a means for determining the direction that the viewer is facing, such as orientation sensors 130, e.g., a tilt corrected compass including a magnetometer, accelerometers and/or gyroscopes.

Mobile platform 100 may include a receiver 140 that includes a satellite positioning system (SPS) receiver that receives signals from SPS satellite vehicles 102 (FIG. 1) via an antenna 144. Mobile platform 100 also includes a means for obtaining a digital map and a top view image, if used, such as a wireless transceiver 145, which may be, e.g., a cellular modem or a wireless network radio receiver/transmitter that is capable of sending and receiving communications to and from a cellular tower 104 or from a wireless access point 106, respectively, via antenna 144 (or a separate antenna) to access server 112 view network 110. If desired, the mobile platform 100 may include separate transceivers that serve as the cellular modem and the wireless network radio receiver/transmitter.

The orientation sensors 130, camera 120, SPS receiver 140, and wireless transceiver 145 are connected to and communicate with a mobile platform control 150. The mobile platform control 150 accepts and processes data from the orientation sensors 130, camera 120, SPS receiver 140, and wireless transceiver 145 and controls the operation of the devices. The mobile platform control 150 may be provided by a processor 152 and associated memory 154, a clock 153, hardware 156, software 158, and firmware 157. The mobile platform control 150 may also include a means for generating an augmentation overlay for a camera view image and an augmentation overlay for a map view and for graphically transitioning between the two views, such as an image processing engine 155, which may be, e.g., a gaming engine, which is illustrated separately from processor 152 for clarity, but may be within the processor 152. The image processing engine 155 determines the shape, position and orientation of the augmentation overlays that are displayed and may use, e.g., conventional graphics techniques to generate the user interface transition between the views. It will be understood as used herein that the processor 152 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

The mobile platform 100 also includes a user interface 110 that is in communication with the mobile platform control 150, e.g., the mobile platform control 150 accepts data and controls the user interface 110. The user interface 110 includes a means for displaying images along with generated augmentation overlays, such as a digital display 162. The display 162 may further display control menus and positional information. The user interface 110 further includes a keypad 164 or other input device through which the user can input information into the mobile platform 100. In one embodiment, the keypad 164 may be integrated into the display 162, such as a touch screen display. The user interface 110 may also include, e.g., a microphone and speaker, e.g., when the mobile platform 100 is a cellular telephone. Additionally, the orientation sensors 130 may be used as the user interface by detecting user commands in the form of gestures.

The methodologies described herein may be implemented by various means depending upon the application. For example, these methodologies may be implemented in hardware 156, firmware 157, software 158, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 154 and executed by the processor 152. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

For example, software 158 codes may be stored in memory 154 and executed by the processor 152 and may be used to run the processor and to control the operation of the mobile platform 100 as described herein. A program code stored in a computer-readable medium, such as memory 154, may include program code to determine a direction that a mobile platform is facing and the position of the mobile platform and to obtain a digital map based on the position of the mobile platform. Further, computer-readable medium may include program code to display a current view and a subsequent view on a display of the mobile platform, wherein the current view and the subsequent view are different views selected from one of a camera view and a view of the digital map and program code to generate and display a user interface transition between the current view and the subsequent view, where the user interface transition includes one or more frames that provide a visual connection between an orientation in the current view on the display and an orientation in the subsequent view in the display. Additionally, the computer-readable medium may include program code to identify at least one visibly identifiable environmental characteristic in an image from a camera of the mobile platform and the same at least one visibly identifiable environmental characteristic in the digital map and program code to generate a first augmentation overlay for the at least one visibly identifiable environmental characteristic in the current view and a second augmentation overlay for the at least one visibly identifiable environmental characteristic in the subsequent view and at least one different augmentation overlay that provides a visual connection between the first augmentation overlay and the second augmentation overlay, wherein the user interface transition comprises the first augmentation overlay, the second augmentation overlay and the at least one different augmentation overlay.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 4:
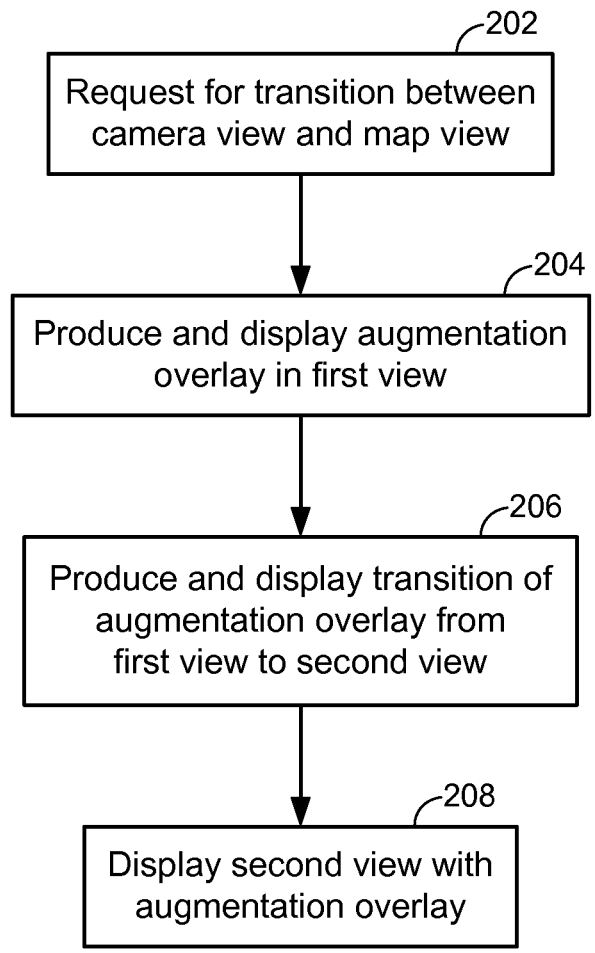
FIG. 4 is a flow chart showing a method of providing a user interface transition between the camera view and the map view.

FIG. 4 is a flow chart showing a method of providing a user interface transition between the camera view and the map view that includes one or more frames to provide a visual connection between an orientation in the camera view and an orientation in the map view. As illustrated in FIG. 4, the mobile platform 100 displays a current view, which may be the camera view or the map view (202). The mobile platform 100 receives a request for a transition between the current view and a subsequent view, (204), i.e., to transition from the camera view to the map view or from the map view to the camera view. The request may be received via the keypad 164 or by a gesture which may be detected by the orientation sensors 130. For example, the request may be from a gesture in the form of moving the mobile platform 100 from a vertical position (e.g., in a position to capture an image) to a horizontal position (in a position to view a map) or vice versa to transition from the map view to the camera view. Other gestures may be used if desired. Alternatively, the request may be initiated by the mobile platform 100, such as from an application that is running on the mobile platform 100.

A user interface transition is produced and displayed, where the user interface transition is one or more frames that provide a visual connection between an orientation in the current view and an orientation in the subsequent view (206). The user interface transition may include a plurality of frames between the current view and the subsequent view and may have a frame rate that is sufficient to produce a visually smooth change from the current view to the subsequent view. If desired, the number of frames or frame rate may be insufficient to produce a visually smooth change, but still provide a visual connection between the orientations in the current view and the subsequent view.

The user interface transition may be generated as a number of augmentation overlays produced using, e.g., the image processing engine 155. A first augmentation overlay may be produced and displayed over the current view and a second augmentation overlay produced and displayed over the subsequent view. One or more different augmentation overlays may be produced and displayed to provide a visual connection between the first augmentation overlay and the second augmentation overlay. The augmentation overlays may be any graphic element that can be changed between views to clearly identify the orientation of the mobile platform 100. For example, the augmentation overlays may be a line or a geometric shape, represented in two or three dimensions, that simply identifies the line of sight of the mobile platform 100 in both the camera view and the map view. The augmentation overlays may also be an element that identifies a specific environmental characteristic, e.g., by outlining, pointing to, covering with a transparent or opaque mask, or any other means of identifying the environmental characteristic. The augmentation overlays may be animated into existence in the display, e.g., by displaying several parts of the augmentation overlay in sequence or all at once.

The augmentation overlay that is used in the map view may be similar or different from the augmentation overlay that is used in the camera view. By way of example, the augmentation overlay in the camera view may be a three dimensional line that changes to or from an augmentation overlay in the form of a two dimensional line in the map view. Additionally, if the augmentation overlay includes an outline of an environmental characteristic, the shape of the outline will likely change between the camera view and the map view. During the transition from the current view to the subsequent view, the camera image and/or map image may be removed so that only the augmentation overlay is illustrated. The images may be removed abruptly or slowly by fading. Alternatively, the transition of the augmentation overlays may be displayed over the cross-faded camera image and map image.

The subsequent view is then displayed (208). For example, if the subsequent view is the map view, the map image may be displayed under an augmentation overlay. The subsequent view may appear in the display abruptly or slowly by fading in. Alternatively, the subsequent view may appear by growing over the overlay, zooming in or out, by tilting in, e.g., from side view to top view, or may appear in two dimensions or three dimensions, or any combination thereof. The augmentation overlay in the map view may be a line or other geometric shape that identifies the line of sight of the mobile platform. Alternatively, as discussed above, the augmentation overlay may be an element that identifies a specific environmental characteristic, e.g., by outlining, pointing to, covering with a transparent or opaque mask, or any other means of identifying the environmental characteristic. The map view may be shown in a heading-up orientation or a North (or South) up orientation. The augmentation overlay may be removed from the subsequent view after a predetermined amount of time or at user request. Alternatively, the augmentation overlay may persist and update as the mobile platform 100 moves or rotates to show the current position and orientation (e.g., line of sight) on the map view. Thus, this method of orientation makes a clear visual connection between the user's field of view, i.e., the camera view, and the map view. Accordingly, the map view is visually connected with the real world elements, solidifying the user's orientation on the map and its relevance to the user.

Figure 5A:
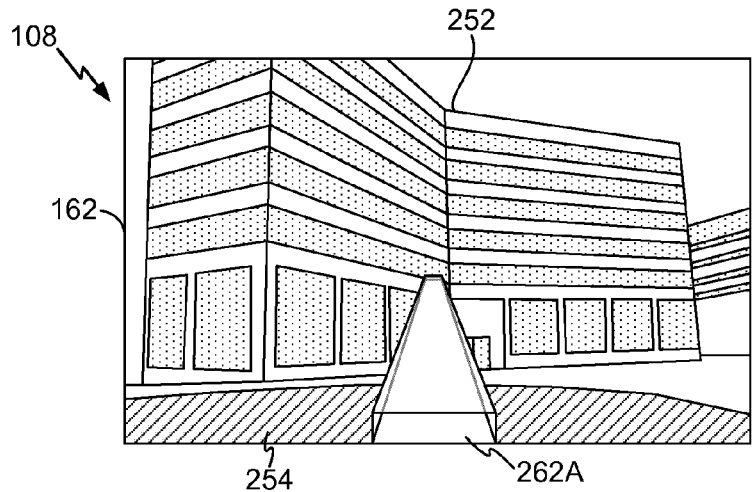
FIGS. 5A, 5B, and 5C illustrate a representative frame (FIG. 5B) in a user interface transition that includes one or more frames between a camera view (FIG. 5A) and a map view (FIG. 5C).
Figure 5B:
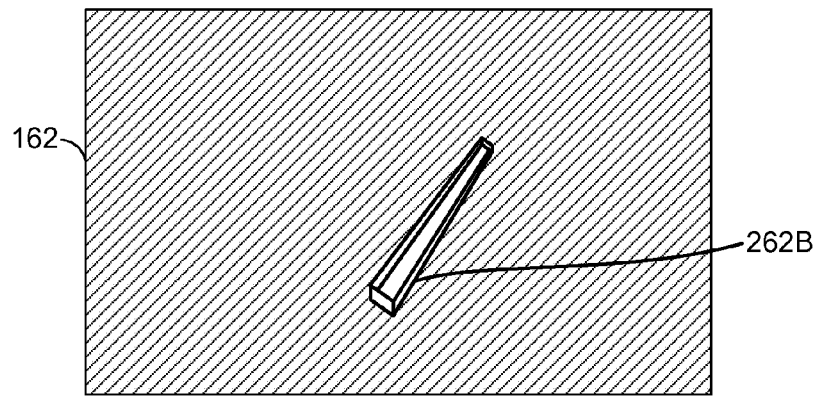
Figure 5C:
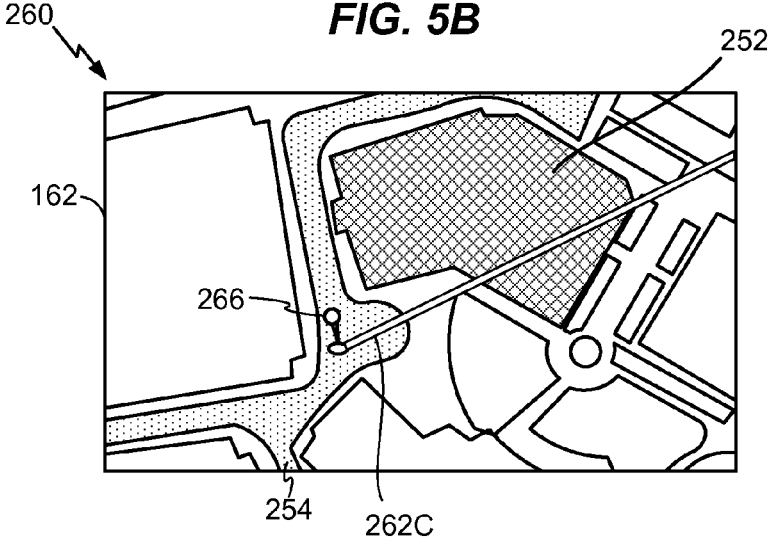

FIGS. 5A, 5B, and 5C illustrate a representative frame (FIG. 5B) in a user interface transition that includes one or more frames between a camera view (FIG. 5A) and a map view (FIG. 5C). FIG. 5A illustrates an image 108 of a building 252 and a road 254 in camera view that may be captured by camera 120 and shown on the display 162 of the mobile platform 100 (202). When the mobile platform 100 receives a request to transition from camera view to map view (204), an augmentation overlay in the form of a three-dimensional line 262A is produced and displayed over the image 108 (206). The three-dimensional line 262A illustrates the line of sight of the mobile platform 100 in this embodiment. If desired, other types of augmentation overlays may be used instead of a line 262A, such as a spot, star, arrow, or any other pattern. The augmentation overlay for the camera view may be a pre-generated graphic, such as line 262A. Alternatively, the augmentation overlay may be generated in real time by the mobile platform 100, particularly, if the augmentation overlay is related to one or more objects within the image 108. For example, instead of representing the line of sight of the mobile platform 100, the augmentation overlay may identify an environmental characteristic, e.g., by pointing to the building 252 or road 254 with a line or other geometric shape, or by outlining the environmental characteristic.

FIG. 5B illustrates one frame in the user interface transition between camera view shown in FIG. 5A and the map view shown in FIG. 5C. FIG. 5B shows the change in the first augmentation overlay (line 262A) in the camera view of FIG. 5A into a second augmentation overlay (line 262C) in the map view of Fig. C (206). It should be understood that the user interface transition may include a plurality of augmentation overlays which are displayed consecutively to clearly illustrate the transition between the first augmentation overlay 262A and the second augmentation overlay 262C, where FIG. 5B illustrates a single representative frame of the user interface transition. The changes in the augmentation overlay s may include rotating as well as elongating and thinning and converting from a three-dimensional line in the camera view of FIG. 5A to a two-dimensional line in the map view of FIG. 5C. FIG. 5B also illustrates that the underlying images, e.g., the camera image 108 and the map image 260 shown in FIG. 5C, may be removed during the user interface transition.

FIG. 5C illustrates a map view shown on the display 162 (208) with an augmentation overlay in the form of a two-dimensional line 262C (206). Additionally, if desired, the location of the mobile platform 100 may be identified on the map view, illustrated in FIG. 5C by a pin 266. The two-dimensional line 262C illustrates the line of sight of the mobile platform 100 in the map view. As discussed above, the augmentation overlay (line 262C) may be a pre-generated graphic that is positioned on the map view based on the orientation of the mobile platform 100 determined from the sensors 130. The augmentation overlay, however, may be generated in real time, particularly, if the augmentation overlay is related to the location of an environmental characteristic.

Figure 6:
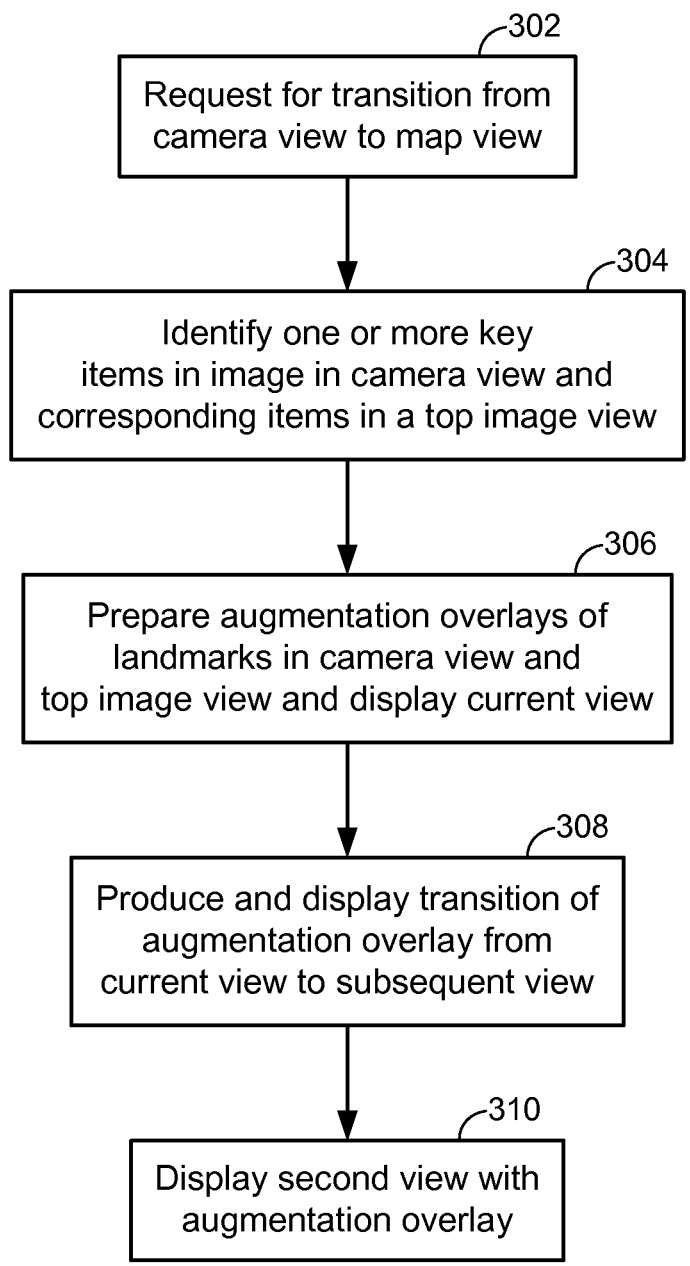
FIG. 6 is a flow chart showing a method of providing a user interface transition between a camera view and a map view, which is similar to the method shown in FIG. 4, except that visibly identifiable environmental characteristics in the images are identified and used.

FIG. 6 is a flow chart showing a method of providing a user interface transition between the camera view and the map view, which is similar to the method shown in FIG. 4, except that visibly identifiable environmental characteristics in the images are identified and used. As described in FIG. 4, the mobile platform 100 displays a current view, which may be the camera view or the map view (302) and receives a request for a transition between the current view and a subsequent view, (304), i.e., to transition from the camera view to the map view or from the map view to the camera view. One or more environmental characteristics are identified in the current view, which may be either the camera image or the map image and the same one or more environmental characteristics are identified in the subsequent view, which may be either the map image or the camera image (306). The environmental characteristics may be, e.g., any visibly discernable item including, but not limited to a line, a simple geometric shape, an area, a landmark, such as a building or road, a color mass, or any combination thereof. The identification of the environmental characteristics may be performed by comparing the direction of lines in the camera image and the map image, which is described in detail in U.S. Ser. No. 12/622,313, filed on Nov. 19, 2009, entitled "Orientation Determination of a Mobile Station Using Side and Top View Images", by Bolan Jiang and Serafin Diaz, which has the same assignee as the present disclosure and which is incorporated herein by reference in its entirety and is described further in FIGS. 8-16 below.

The user interface transition is prepared by preparing a first augmentation overlay for the identified environmental characteristic(s) in the current view and preparing a second augmentation overlay for the identified environmental characteristic(s) in the subsequent view and at least one different augmentation overlay that provides a visual connection between the first augmentation overlay and the second augmentation overlay (308). As discussed above, the at least one different augmentation overlay may include a plurality of a plurality of augmentation overlays that when displayed consecutively clearly illustrate the change from the first augmentation overlay and the second augmentation overlay. The augmentation overlays may be produced using, e.g., the image processing engine 155. The augmentation overlays may be any visible means of identifying the environmental characteristic. For example, the augmentation overlays may be in the form of a line or other shape that points to or otherwise identifies the environmental characteristic. Alternatively, the augmentation overlay may be an outline of the environmental characteristic, which may be illustrated simply by lines or by covering the environmental characteristic with a semi-transparent or opaque mask. If desired, environmental characteristic may be clearly identified using differently colored lines or differently colored opaque masks.

Alternatively, the augmentation overlays may be at least a portion of the image of the identified environmental characteristic itself. For example, the environmental characteristic may be captured as an image, and the image cropped based on the identifying information for the environmental characteristic. The resulting cropped image may be the environmental characteristic(s) with the background removed. A similar augmentation overlay may be produced for the map view in a similar manner, e.g., cropping out the background of the map view image leaving the environmental characteristic(s). The changes between the augmentation overlays for the camera view and the map view may be produced, e.g., by graphically transitioning or morphing the cropped images of the environmental characteristic(s) in the camera view and the map view.

The first augmentation overlay is displayed, followed by displaying the at least one different augmentation overlay and then displaying the second augmentation overlay (310) and the subsequent view is displayed (312). The first augmentation overlay may be displayed over the current view or the current view may be removed before the displaying the first augmentation overlay. Similarly, the second augmentation overlay may be displayed over the subsequent view or the second augmentation overlay may be removed before the displaying the subsequent view. The augmentation overlays may be animated into existence in the display, e.g., by displaying several parts of the augmentation overlay in sequence or all at once. The change between the first augmentation overlay to the second augmentation overlay may be illustrated using a plurality of different augmentation overlays that are consecutively displayed with a frame rate sufficient to produce a visually smooth change. Of course, a smooth transition is not required to illustrate the change, and thus, fewer different augmentation overlays and/or a decreased frame rate may be used if desired.

Figure 7A:
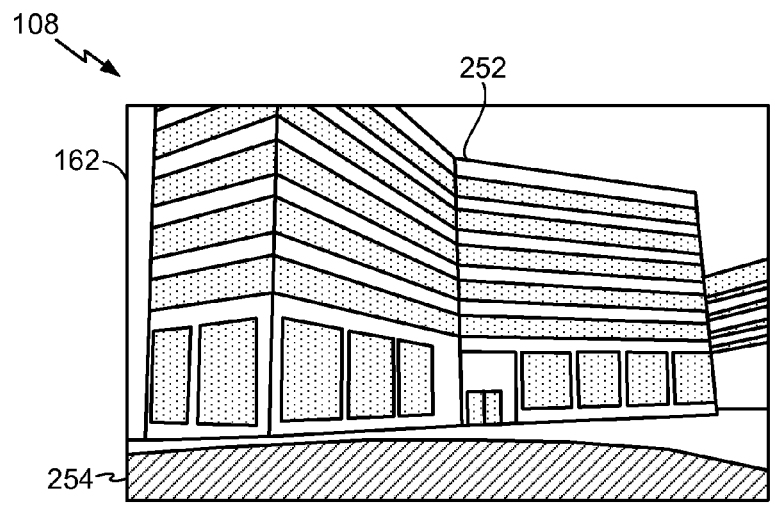
FIGS. 7A, 7B, 7C, 7D, and 7E illustrate representative frames (FIG. 7B, 7C, 7D) in a user interface transition that includes multiple frames between a camera view (FIG. 7A) and a map view (FIG. 7E).
Figure 7B:
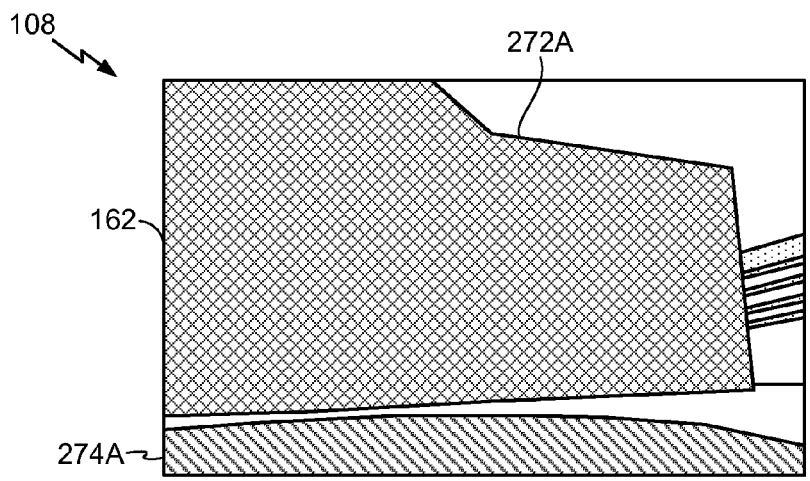
Figure 7C:
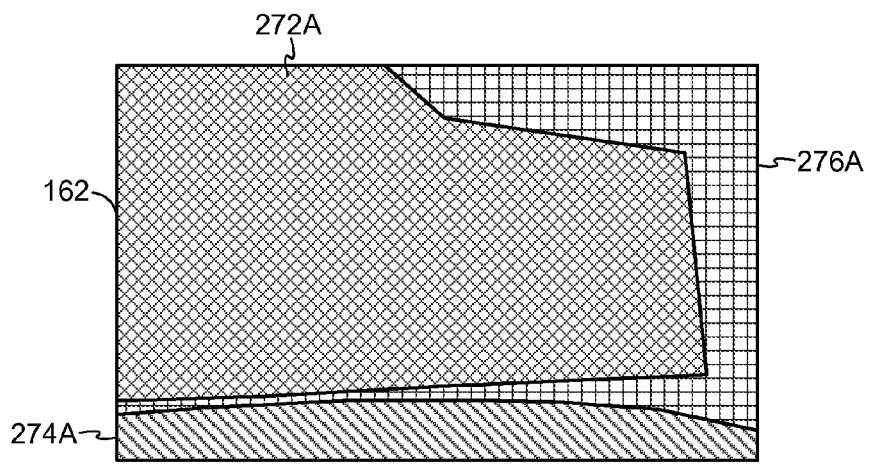
Figure 7D:
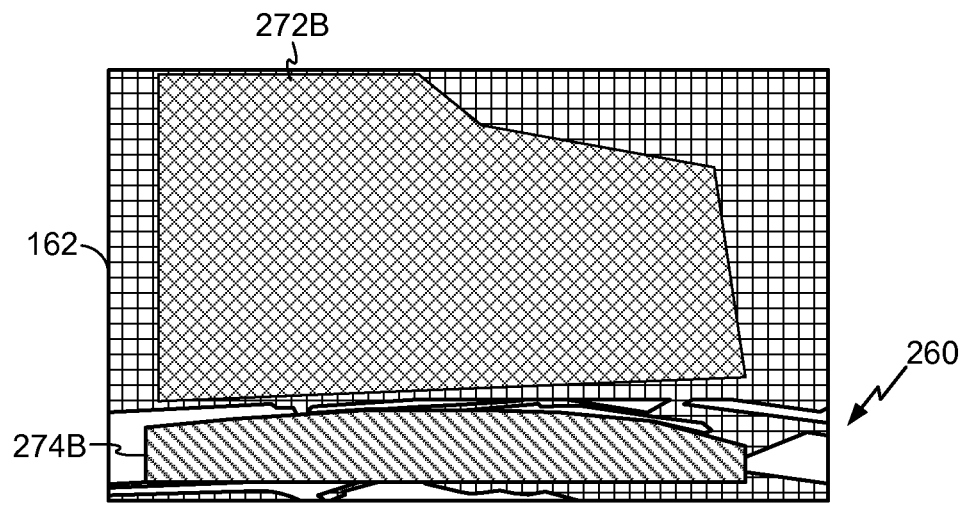
Figure 7E:
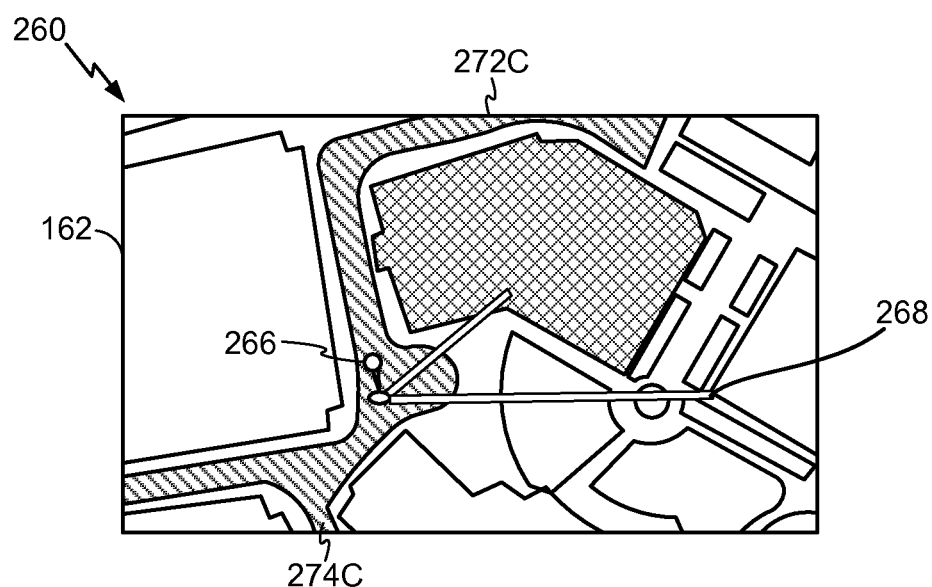

FIGS. 7A, 7B, 7C, 7D, and 7E illustrate representative frames (FIG. 7B, 7C, 7D) in a user interface transition that includes multiple frames between a camera view (FIG. 7A) and a map view (FIG. 7E) based on visibly identifiable environmental characteristics. FIG. 7A is similar to FIG. 5A and illustrates an image 108 of a building 252 and a road 254 in camera view that may be shown on the display 162 of the mobile platform 100. When the mobile platform 100 receives a request to change from camera view to map view (304), environmental characteristics, such as the building 252 and the road 254 are identified (306) in both the camera view (FIG. 7A) and the map view (FIG. 7E).

Augmentation overlays for the identified environmental characteristics are prepared for the camera view (shown in FIG. 7B) and the map view (shown in FIG. 7E) along with one or more different augmentation overlays (shown in FIG. 7D) that illustrate the changes in the augmentation overlay for the camera view (FIG. 7B) and the map view (FIG. 7E) (308). FIG. 7B illustrates, for example, the display of the augmentation overlay for the camera view (310) in the form of mask 272A, 274A that covers the building 252 and the road 254. The mask 272A, 274A has different colors, hatching, or other means for identifying the different environmental characteristics. Of course, other environmental characteristics may be identified and augmented if desired. Moreover, the augmentation overlay may be in another form. For example, a geometric identifier, such as a line, spot, star, arrow, or other simple or complex shape may be used. Alternatively, an outline of the environmental characteristics may be used with the image of the environmental characteristics remaining visible. As can be seen in FIG. 7B, while the identified environmental characteristics, i.e., building 252 and road 254, are covered with mask 272A, 274A, the remainder of the image 108 may remain visible. If desired, the remainder of the image 108 may be removed, as illustrated in FIG. 7C, which shows the display 162 with the augmentation mask 272A, 274A while the underlying camera image 108 has been removed as illustrated by area 276A.

FIG. 7D illustrates the display of the one or more augmentation overlays (310) that illustrate the changes in the augmentation overlay for the camera view (FIG. 7B) and the map view (FIG. 7E). As illustrated, the augmentation overlay 272B, 274B for the building 252 and road 254 are changing from their shape and position in the camera view (FIG. 7B) to their final shape and position in the map view shown in FIG. 7E. FIG. 7D also illustrates the map image 260 being displayed in a tilted side view with the augmentation overlay 272B, 274B displayed over the map image 260. It should be understood that plurality of augmentation overlays may be displayed consecutively to clearly illustrate the change between the augmentation overlay for the camera view (FIG. 7B) and the map view (FIG. 7E) and that FIG. 7D illustrates merely one representative augmentation overlay in the user interface transition and that if desired many consecutive images with the augmentation overlays continuing to transform in shape and position, and optionally, the map view continuing to tilt into a top view, may be used to provide a smooth transition from the camera view to the map view.

FIG. 7E illustrates the display of the image 260 for the map view 260 (312), which can be shown as heading up or North (South) up. As can be seen, the map view identifies the building 252 and road 254 with an augmentation overlay in the form of mask 272C, 274C. Additionally, if desired, the location of the mobile platform 100 may be identified on the map view, illustrated in FIG. 7E by a pin 266. Additional information may also be displayed if desired, such as a pie slice orientation element 268 that illustrates the approximate field of view from the camera view. If desired, the additional elements, e.g., pin 266 or orientation element 268 maybe animated into view or may drop into view. The augmentation overlay in the map view may persist or may disappear or fade, e.g., after a period of time or when the mobile platform 100 moves from its current position.

FIGS. 8-16 illustrate a method of identifying one or more key environmental characteristics from the image 108 produced by the camera 120 with as well as the corresponding environmental characteristics in a top image view as discussed in (304) of FIG. 6.

Figure 8:
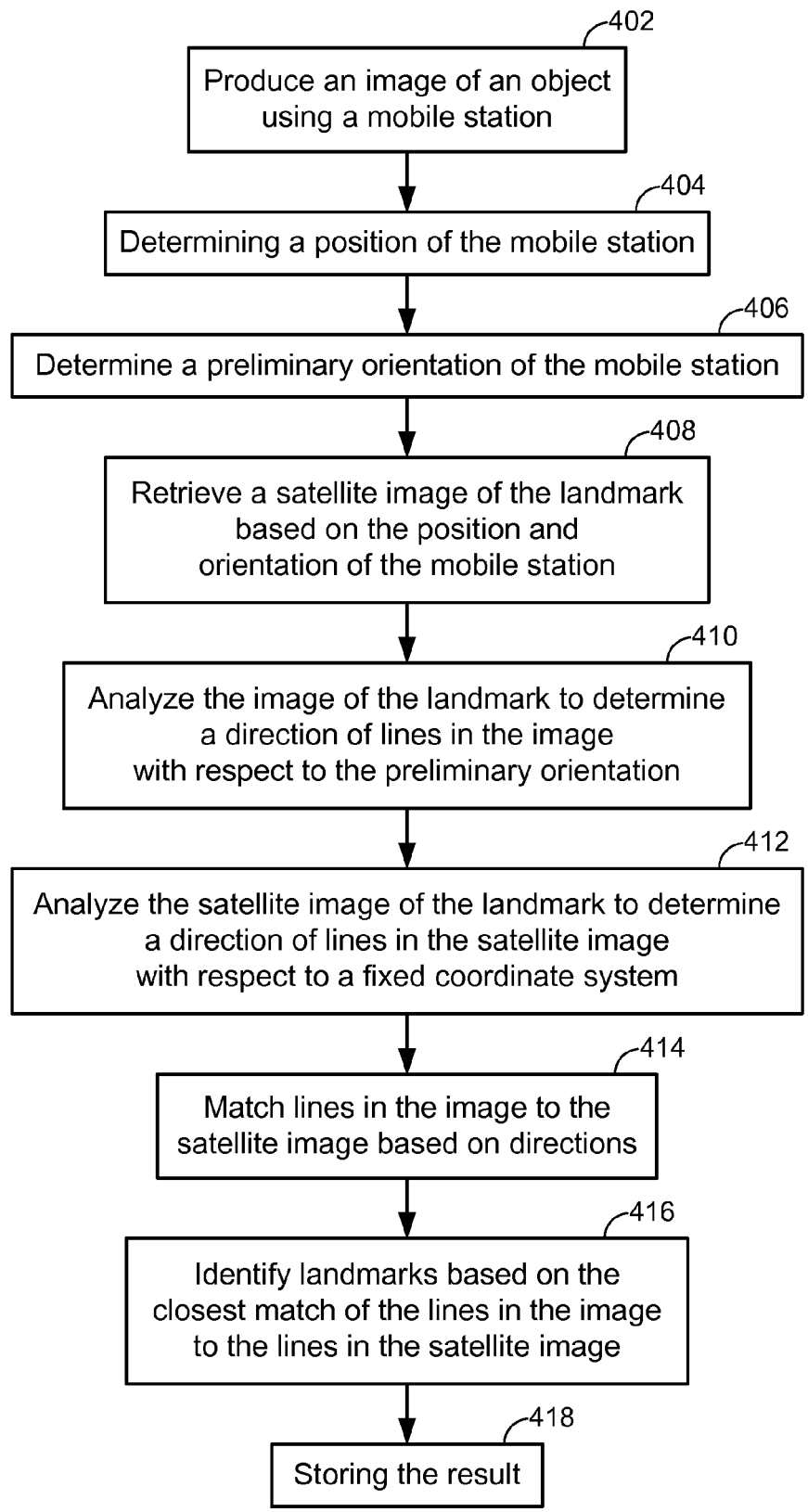
FIG. 8 is a flow chart showing a method of identifying visibly identifiable environmental characteristics using an image produced by the mobile platform and a top view image of the visibly identifiable environmental characteristics.
Figure 9:
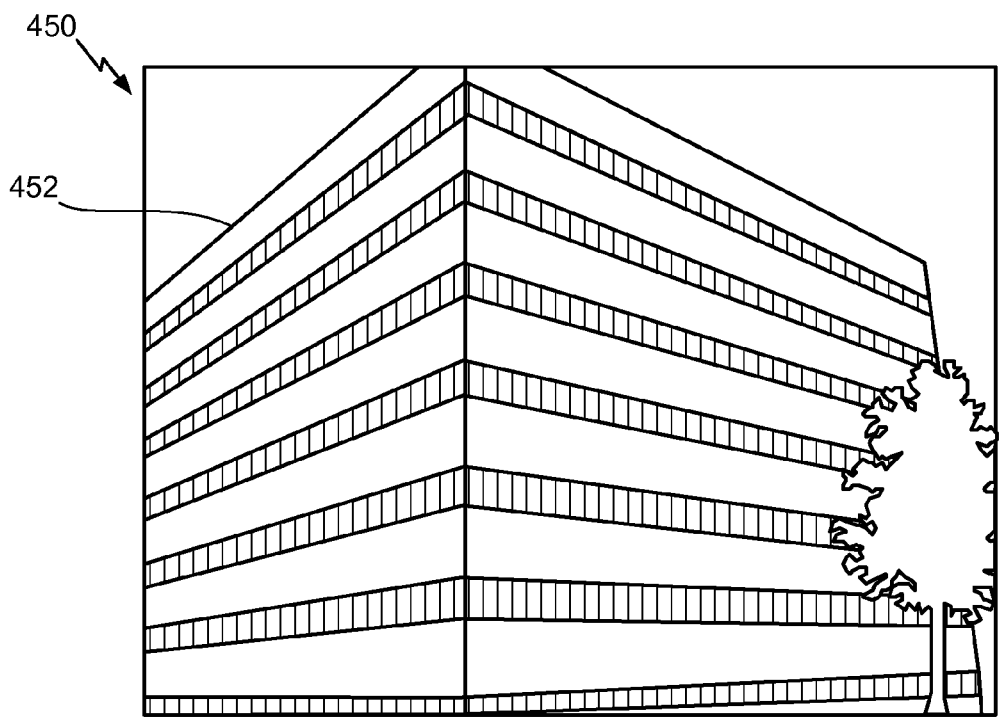
FIG. 9 illustrates an image of a building that may be captured by a camera on the mobile platform.

FIG. 8 is a flow chart showing a method of identifying an environmental characteristic using an image of the environmental characteristic produced by the mobile platform and a top view image of the environmental characteristic. As shown in FIG. 8, the mobile platform captures an image of the environmental characteristic (402), e.g., using the camera 120. The environmental characteristic that is imaged may be a structure, such as a building or street or any other type of environmental characteristic that is visibly identifiable in a top view image. By way of example, FIG. 9 illustrates an image 450 of a building 452 that may be produced by the mobile platform 100. The environmental characteristic that is imaged may include edges or lines, such as those illustrated on building 452 in FIG. 9, with which the mobile platform 100 can identify the orientation of the environmental characteristic in the image.

The position of the mobile platform is determined (404) at or near the time that the image is produced. The time between the determination of the position and producing the image should be minimized to reduce possible errors in the identification of the environmental characteristic that may be caused by movement of the mobile platform from the imaging position. The position of the mobile platform may be determined using an SPS system, e.g., data from a SPS system is received by the SPS receiver 140 (FIG. 3) from which processor 152 calculates the position. If desired, the position may be determined using other techniques and devices including using data from other various wireless communication networks, including cellular towers 104 and from wireless communication access points 106 or using visual positioning techniques.

The preliminary orientation of the mobile platform 100 may be determined (206), e.g., using the orientation sensors 130, which may include a tilt corrected compass such as a magnetometer and an accelerometer or gyroscopes. The orientation sensors 130 provide preliminary orientation data to the processor 152, which calculates the preliminary orientation. In another embodiment, the preliminary orientation of the mobile platform is not determined and the top view image is obtained and analyzed without use of a preliminary orientation measurement.

Figure 10:
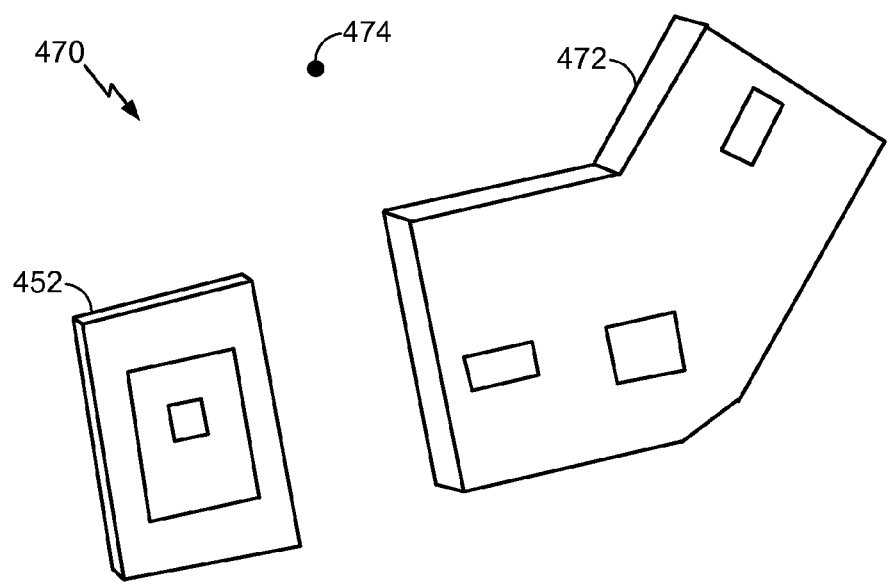
FIG. 10 illustrates a possible top view image that includes a top view of the building from FIG. 9 along with other structures.

A top view image of the environmental characteristic in the image may be retrieved from local memory 154 or from a server 112 and database 115 (FIG. 2) based on the position of the mobile platform and in one embodiment on the preliminary orientation of the mobile platform (408). For example, a server 112 is accessed through network 110, e.g., via cellular tower 104 or wireless access point 106, illustrated in FIG. 1. In some embodiments, the network 110 may be accessed through a satellite vehicle. Having determined the position of the mobile platform at the time that the image was produced, the server 112 is queried based on the determined position, e.g., latitude and longitude, of the mobile platform and a digital top view image at the determined position is obtained and downloaded to the mobile platform with sufficient resolution that the environmental characteristic in the image 450 is resolved in the top view image. By way of example, a satellite image with sufficient resolution to identify lines or edges on the environmental characteristic may be used. With information about the preliminary orientation of the mobile platform, the top view image may be retrieved from the server 112 offset towards the direction of the preliminary orientation to place the environmental characteristic in the image closer to the center of the top view image. By way of example, FIG. 10 illustrates a possible top view image 470 that includes a top view of the environmental characteristic, i.e., building 452 from the image 450, along with other structures and details, such as building 472. Location 474 shown in the top view image 470 represents the determined position of the mobile platform at the time the image 450 in FIG. 9, was produced.

Figure 11:
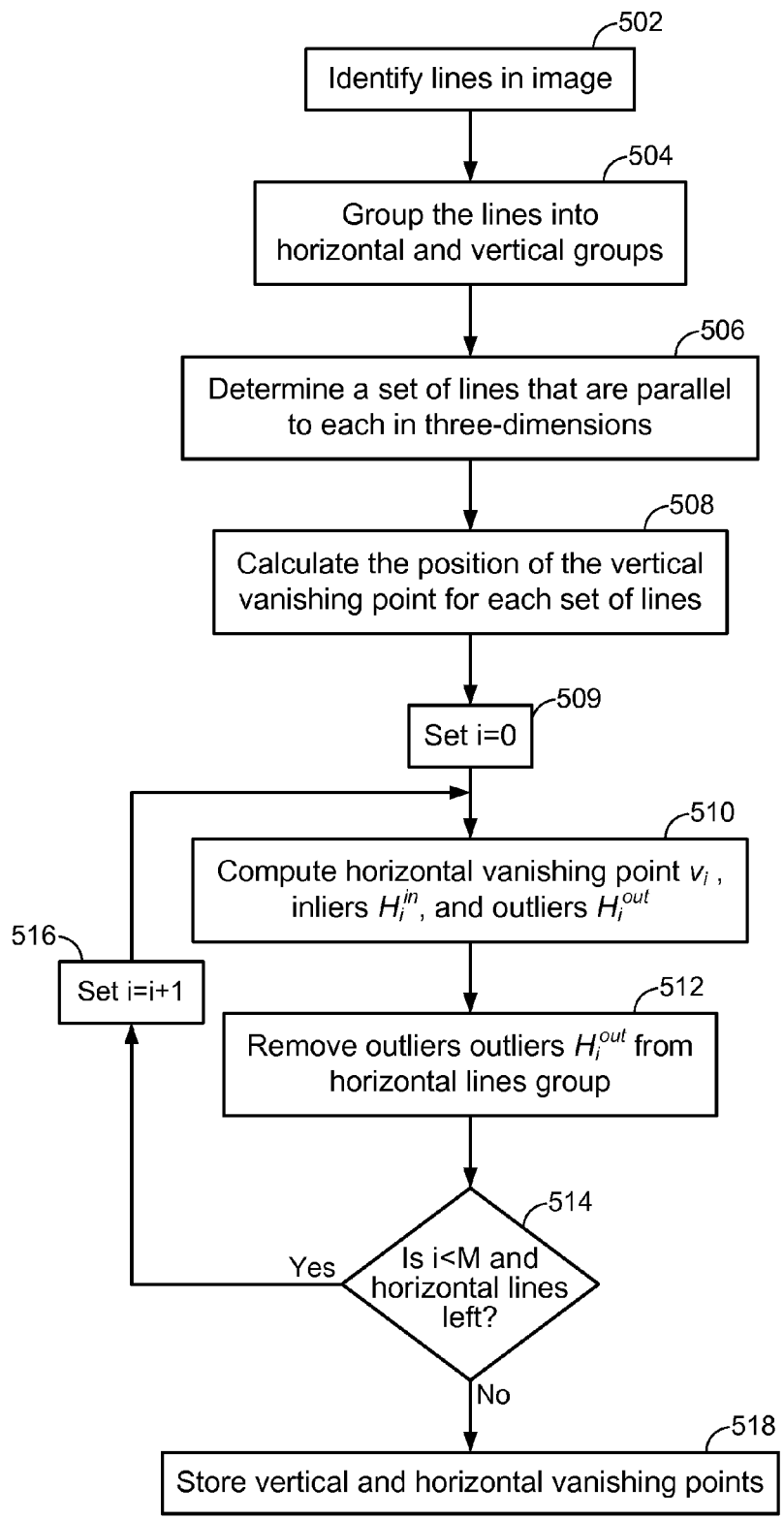
FIG. 11 illustrates a method of analyzing the camera image to identify lines and determine the direction of the lines.

The image 450 of the environmental characteristic is analyzed to identify lines on the environmental characteristic and to determine a direction of the lines (410). In one embodiment, the direction of lines on the environmental characteristic may be determined with respect to the preliminary orientation of the mobile platform. The image 450 of the environmental characteristic may be analyzed, e.g., by the image processing engine 155, which may be part of or separate from processor 152 (FIG. 3). Analyzing the image to identify lines on an environmental characteristic and to determine the direction of the lines, e.g., using a vanishing point estimation technique is discussed in "Geometrical Feature-Based Wall Region And SIFT For Building Recognition", by H H Trinh, D N Kim, H U Chae and K H Jo, International Symposium on Electrical & Electronics Engineering 2007, pp 74-79, which is incorporated herein by reference. FIG. 11 illustrates a method of analyzing the image 450 to identify lines and determine the direction of the lines. As illustrated in FIG. 11, the lines in the image are identified (502), which may be performed using any desired edge or line detector operator, e.g., a convolution kernel, such as Canny, Sobel, or Robers Cross that detect edge pixels, which are then connected and fitted into line segments. Alternative method may be used as well such a line fitting algorithm such as a Hough transform. The lines are then grouped into horizontal and vertical groups (504). For example, if the angle between a line and the vertical axis on the image is smaller than a predetermined angle, such as 20 degrees, then the line is classified as a vertical line, and otherwise the line is classified as a horizontal line. Due to foreshortening, the image will include lines that are not parallel in the two-dimensional image, even if they are parallel in three-dimensions. Sets of vertical lines that are parallel to each other in three-dimensions are then determined (506). Lines are identified as being a parallel in three-dimensions if they pass through the same vanishing point in the two-dimensional image. For example, a vanishing point for two lines may be identified, and it is determined if other lines pass through the same vanishing point. If three or more lines pass through the same vanishing point, e.g., those lines are considered parallel. The position of the vertical vanishing point for the three-dimensionally parallel lines is calculated (508).

Figure 12:
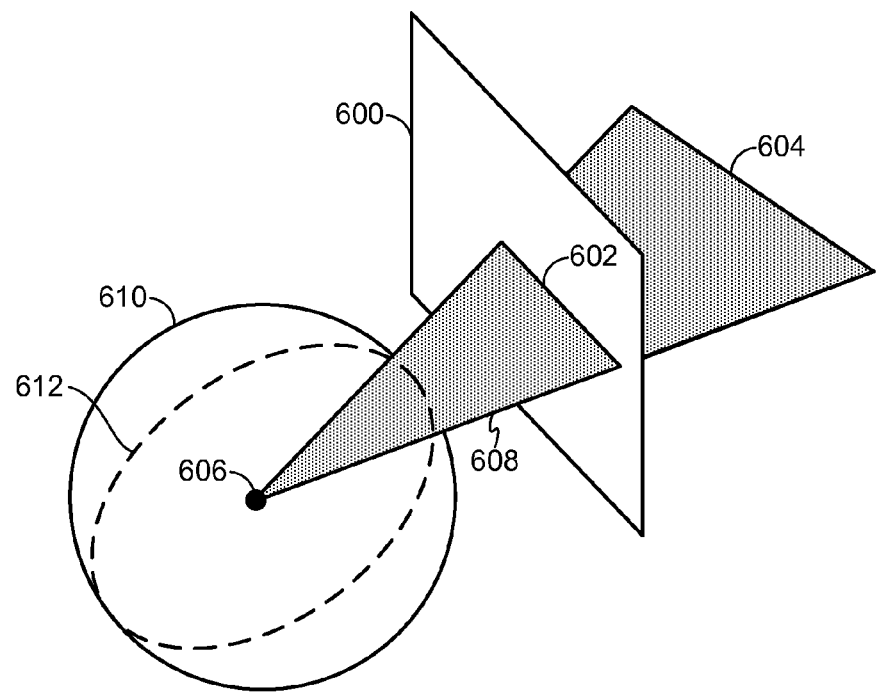
FIGS. 12 and 13 illustrate the determination of a vanishing point used in the identification of the visibly identifiable environmental characteristics in the camera image and top view image.
Figure 13:
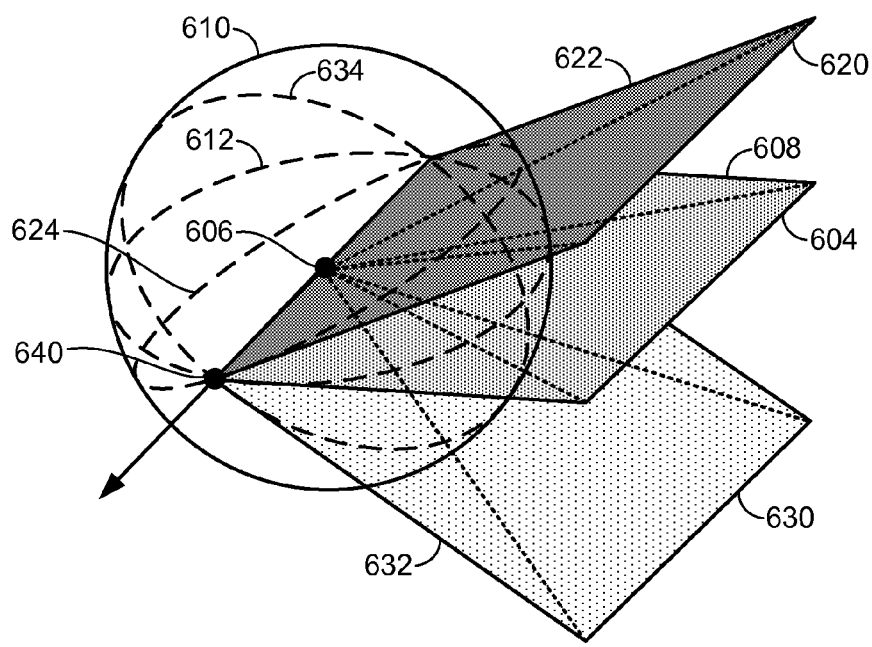

FIGS. 12 and 13 illustrate the determination of a vanishing point. FIG. 12 illustrates a plane 608 formed by the camera position 606, a two dimensional line 602 in an image 600 and the corresponding line 604 in three-dimensional space. A Gaussian (unit) sphere 610 is illustrated centered on the camera position 606, and the plane 608 intersects the Gaussian sphere 610 on a great circle 612. FIG. 13 illustrates the plane 608 formed by line 604 in three-dimensional space and the camera position 606 along with the Gaussian sphere 610 and the corresponding great circle 612. FIG. 13 also shows two additional lines 620 and 630 that are parallel to line 604 in three dimensional space, along with the planes 622 and 632 formed by the respective lines 620 and 626 and the camera position 606 and the corresponding great circles 624 and 634. The great circles 612, 624 and 634 intersect at a common vanishing point 640 on the Gaussian sphere 610, which can be used to identify the direction for the parallel lines 604, 620, and 630. Given a set of n lines that are parallel to each other in three-dimensional space, the vanishing point V is determined by solving the following equation:

$$l_i^T V_j = 0 \qquad \text{Eq. 1}$$

where $l_i=(a_i, b_i, c_i)$ represents the ith line. A method, such as RANSAC (RANdom SAmple Consensus) may be used to estimate the vertical vanishing point. It should be understood that the described vanishing point estimation method may be used when the image is produced by a roughly upright camera. If desired, other known vanishing point estimation methods may be used.

For vertical lines, there is only one vanishing point to determine, thus, equation 1, needs to be solved only once. For horizontal lines, however, multiple vanishing points are possible. To determine horizontal vanishing points, i is set to 0 (509) and the RANSAC method is used to compute the vanishing point $v_i$, the inliers $H_i^{in}$ and the outliers $H_i^{out}$ (510). The outliers $H_i^{out}$ are removed from the horizontal lines group (512). If i<M and there are more than six horizontal lines left (514), i is increased by one (516) and the process is repeated. If i is not less than M, or if there are no more than six horizontal lines left (514), the process ends and the vertical and horizontal vanishing points are stored (518), e.g., in memory 154 (FIG. 3). By way of example, the value M may be set at 5 or at any other desired value for the number of horizontal vanishing points to be used.

Figure 14:
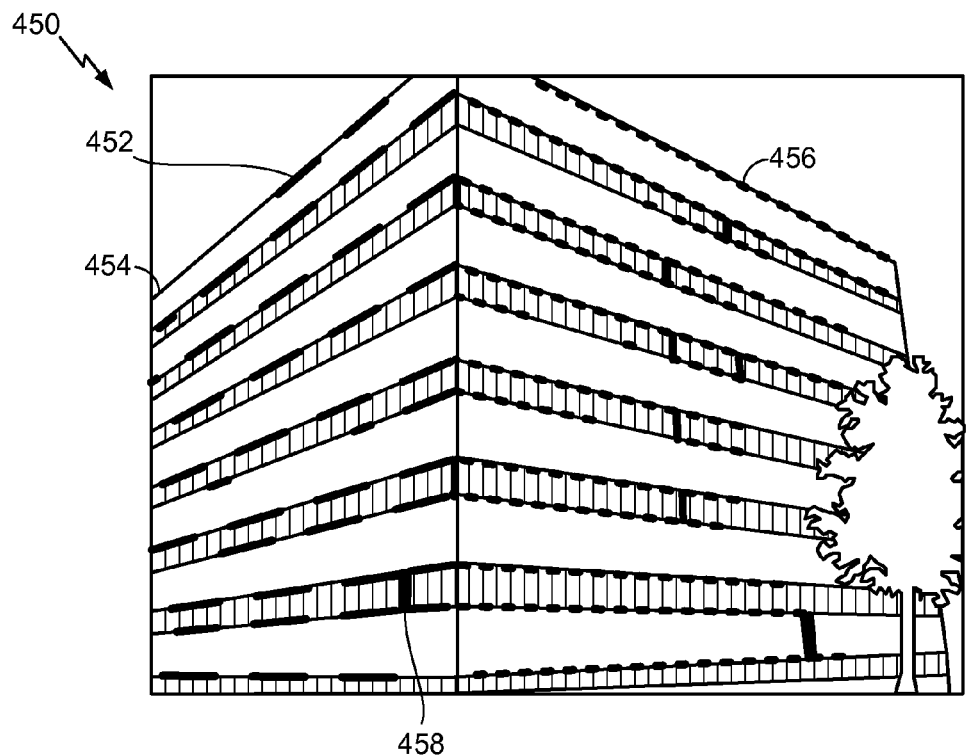
FIG. 14 illustrates an image of the building from FIG. 9, with identified lines included in two sets of horizontal lines and one set of vertical lines.
Figure 15:
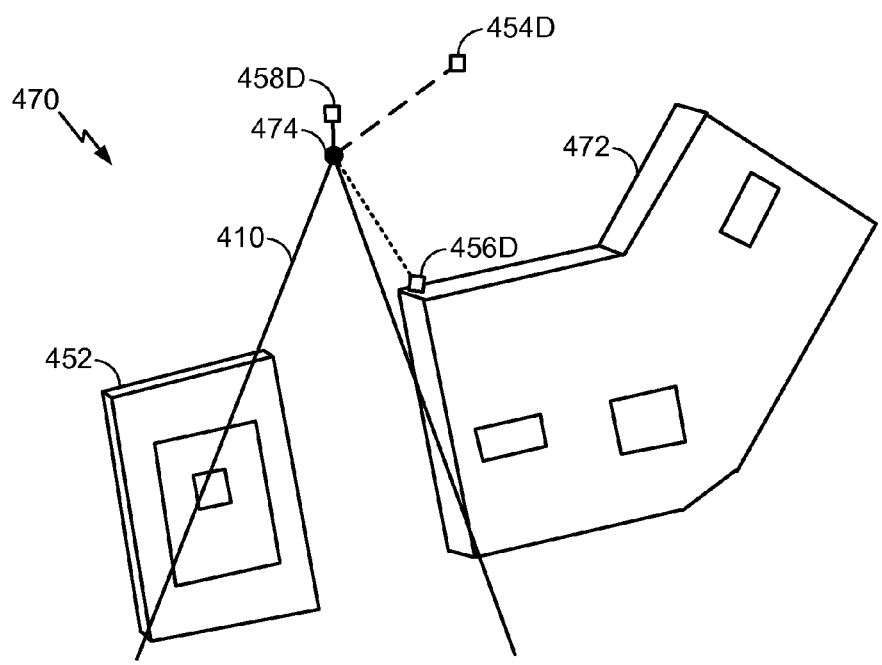
FIG. 15 illustrates the top view image with the direction of the sets of horizontal and vertical lines shown with respect to the position of the camera along with the orientation of the camera.

FIG. 14, by way of example, illustrates image 450 with building 452, with lines identified and included in a first set of horizontal lines 454, a second set of horizontal lines 456 and a set of vertical lines 458. FIG. 15 illustrates the top view image 470 with the direction 454D of the first set of horizontal lines 454, the direction 456D of the second set of horizontal lines 456 and the direction 458D of the vertical lines 458 illustrated with respect to the camera location 474 along with the orientation of the camera, which is illustrated as the field of view 473 of the camera.

Referring back to FIG. 8, the top view image 470 of the environmental characteristic is analyzed to identify lines or edges and to determine the direction of the lines with respect to the known and fixed coordinate system of the top view image (412). The lines in the top view image 470 may be identified in the same manner as described above, e.g., using an edge or line detector operator, such as a convolution kernel, the Robers Cross, Sobel, or Canny edge detectors. The environmental characteristic to be analyzed in the top view image 470 may be identified as the environmental characteristic that is within the field of view 473 of the camera, i.e., closest to the determined preliminary orientation of the mobile platform. If a preliminary orientation for the mobile platform is not determined, all environmental characteristics within the top view image may be analyzed to identify the directions of the lines on the environmental characteristic.

Figure 16:
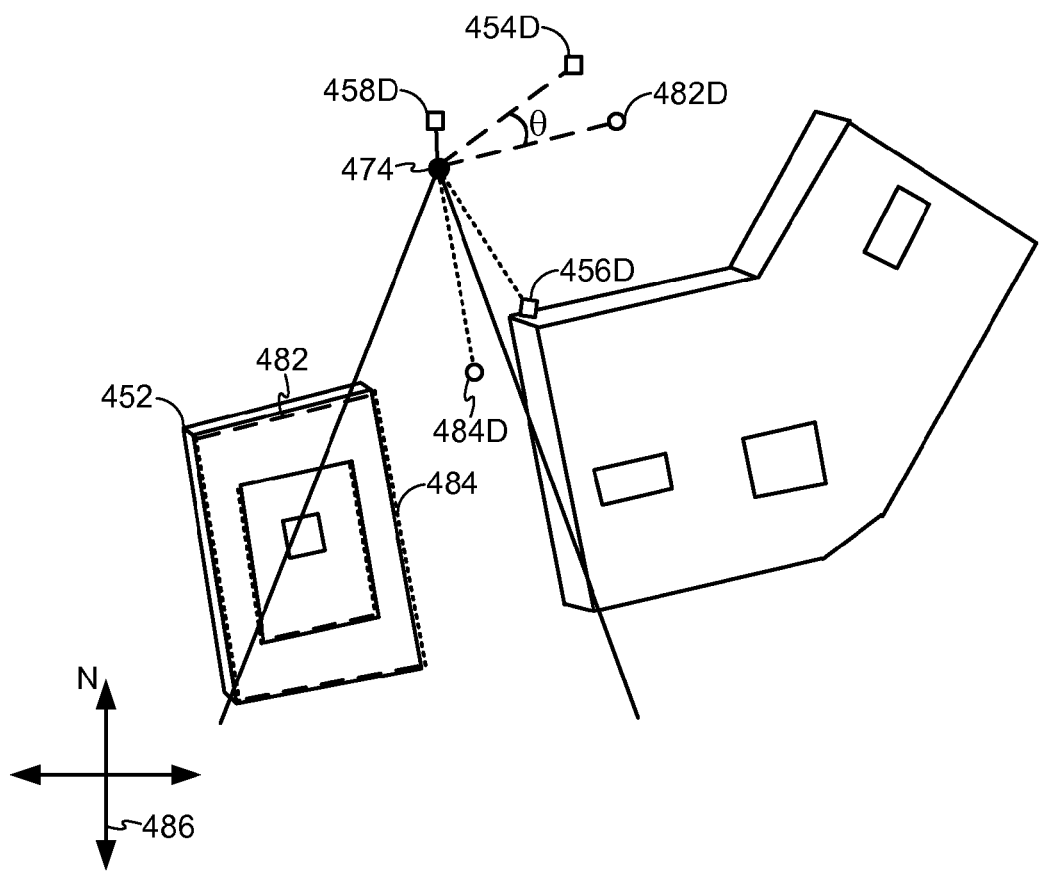
FIG. 16 illustrates the top view image with the detected edges of the top of building identified and matched to the direction of the sets of horizontal lines.

FIG. 16, is similar to FIG. 15, and illustrates the top view image 470 with the detected edges of the top of building 452 identified. As can be seen, two sets of lines 482 and 484 are shown with respect to building 452. The direction of the lines 482 and 484 with respect to a known and fixed coordinate system 486 of the top view image 470 is determined. There may be additional lines identified in the top view image 470 and, thus, lines in the top view image 470 are matched to lines in the image 450 based on the directions of the lines (412) (FIG. 8). In one embodiment, the matching of lines is performed by comparing the angles between lines in the top view image 470 with the angle between the directions 454D and 456D, where the smallest difference is considered a match. This process is simplified if the preliminary orientation of the mobile platform is known, otherwise a more rigorous process of matching sets of lines may be used. The directions 482D and 484D of the top view image lines 482 and 484, respectively, are illustrated in FIG. 16 with respect to the camera location 474.

Environmental characteristics can then be identified based on the closest match of lines in the image to the lines in the satellite image (416). Moreover, augmentation overlays of the environmental characteristics, e.g., the outline or mask of the environmental characteristics or any other visible means of identifying the environmental characteristics, may be based on the identified lines in the image and the satellite image, as performed in steps 410 and 412. The result, including the identified environmental characteristics as well as the produced augmentation overlay is stored (418) (FIG. 8), e.g., in memory 154 (FIG. 3).

If desired, additional processing may be performed, such as the determination of the true orientation of the mobile platform based on the relative orientation of the direction of the lines in the image with respect to the direction of the lines in the top image, as described in detail in U.S. Ser. No. 12/622,313, filed on Nov. 19, 2009, entitled "Orientation Determination of a Mobile Station Using Side and Top View Images", by Bolan Jiang and Serafin Diaz, which is incorporated herein by reference in its entirety.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
  displaying a camera view on a display of a device, the camera view including an image captured by a camera on the device;
  receiving a request to transition from the camera view to a map view on the display;
  producing and displaying a user interface transition on the display, the user interface transition comprising:
    multiple frames including a first frame having the camera view, a second frame having the map view, and an intermediate frame;
    wherein the first frame includes a first augmentation overlay graphic element being displayed in response to receiving the request to transition, the first augmentation overlay graphic element being overlaid over the captured image in the camera view and identifying a line of sight from the perspective of the camera relative to the image in the camera view;

wherein the second frame includes a second augmentation overlay graphic element identifying the line of sight in the map view;

wherein the intermediate frame is displayed between the first frame and the second frame to provide a visual connection between the first augmentation overlay graphic element and the second augmentation overlay graphic element, the intermediate frame including an intermediate augmentation overlay graphic element; and wherein the first augmentation overlay graphic element, the intermediate augmentation overlay graphic element, and the second augmentation overlay graphic element show a change in a first direction of the line of sight with respect to the display in the camera view to a second direction of the line of sight with respect to the display in the map view, wherein the first direction of the line of sight with respect to the display is different than the second direction of the line of sight with respect to the display; and displaying the second frame having the map view on the display.

2. The method of claim 1, further comprising:

wherein the first frame includes a third augmentation overlay graphic element being displayed in response to receiving the request to transition, the third augmentation overlay graphic element highlighting a visibly identifiable environmental characteristic in the camera view;

wherein the second frame includes a fourth augmentation overlay graphic element highlighting the visibly identifiable environmental characteristic in the map view;

wherein the intermediate frame includes an additional intermediate augmentation overlay graphic element highlighting the visibly identifiable environmental characteristic, the additional intermediate augmentation overlay graphic element providing a visual connection between the third augmentation overlay graphic element and the fourth augmentation overlay graphic element; and wherein the third augmentation overlay graphic element, the additional intermediate augmentation overlay graphic element, and the fourth augmentation overlay graphic element show a change in a first position of the visibly identifiable environmental characteristic with respect to the display in the camera view to a second position of the visibly identifiable environmental characteristic with respect to the display in the map view.

3. The method of claim 2, further comprising:

identifying the visibly identifiable environmental characteristic in the camera view;

identifying the same visibly identifiable environmental characteristic in the map view;

preparing the third augmentation overlay graphic element for the visibly identifiable environmental characteristic in the camera view;

preparing the fourth augmentation overlay graphic element for the visibly identifiable environmental characteristic in the map view;

preparing the additional intermediate augmentation overlay graphic element that provides the visual connection between the third augmentation overlay graphic element and the fourth augmentation overlay graphic element;

displaying the third augmentation overlay graphic element for the camera view in the first frame;

displaying the additional intermediate augmentation overlay graphic element in the intermediate frame; and displaying the fourth augmentation overlay graphic element for the map view in the second frame.

4. The method of claim 3, wherein the identified visibly identifiable environmental characteristic is at least one or more of a line, geometric shape, an area, building, and a color mass.

5. The method of claim 3, wherein the third augmentation overlay graphic element and the fourth augmentation overlay graphic element for the visibly identifiable environmental characteristic are at least one or more of a line, geometric shape, an area, a color, an outline, and a cropped image of the visibly identifiable environmental characteristic, and are at least one or more of opaque, transparent, two-dimensional, or three-dimensional.

6. The method of claim 1, wherein producing and displaying the user interface transition comprises producing and displaying a change of at least one or more of a position, orientation, shape and perspective between the first augmentation overlay graphic element and the second augmentation overlay graphic element with the intermediate augmentation overlay graphic element.

7. The method of claim 1, further comprising removing the image from the camera view while displaying the user interface transition.

8. The method of claim 1, wherein the transition between the camera view and the map view is requested using a gesture.

9. The method of claim 1, wherein the image is displayed while displaying the user interface transition.

10. The method of claim 1, further comprising showing a location of a user in the map view.

11. The method of claim 1, wherein the second augmentation overlay graphic element includes at least one or more of a line, dotted line, two-dimensional arrow, three-dimensional arrow, and a pie-slice view orientation element.

12. The method of claim 1, wherein the map view is at least one or more of a two-dimensional map representation, a three-dimensional map representation, a three-dimensional top view, and a satellite image view.

13. The method of claim 1, wherein the intermediate frame does not include an interpolation of the camera view or an interpolation of the map view.

14. The method of claim 1, wherein a direction of a field of view of the camera is identified by a direction of the line of sight with respect to the map view.

15. A mobile platform comprising:

a camera being operable to capture an image in a direction that the camera is facing;

one or more orientation sensors that provide data with respect to the direction the camera is facing;

a processor connected to the camera and the one or more orientation sensors;

memory connected to the processor;

software held in the memory and run in the processor to cause the processor to:

determine a position of the mobile platform using positioning data from a satellite positioning receiver and the direction that the camera is facing using the data from the orientation sensors;

obtain a digital map based on the position of the mobile platform;

display a camera view on the display of a device, the camera view including the image captured by the camera;

receive a request to transition from the camera view to a map view on the display;

produce and display a user interface transition on the display, the user interface transition comprising multiple frames including a first frame having the camera view, a second frame having the map view, and an intermediate frame, wherein the first frame includes a first augmentation overlay graphic element being displayed in response to receiving the request to transition, the first augmentation overlay graphic element being overlaid over the captured image in the camera view and identifying a line of sight from the perspective of the camera relative to the image in the camera view, wherein the second frame includes a second augmentation overlay graphic element identifying the line of sight in the map view, wherein the intermediate frame is displayed between the first frame and the second frame to provide a visual connection between the first augmentation overlay graphic element and the second augmentation overlay graphic element, the intermediate frame including an intermediate augmentation overlay graphic element, and wherein the first augmentation overlay graphic element, the intermediate augmentation overlay graphic element, and the second augmentation overlay graphic element show a change in a first direction of the line of sight with respect to the display in the camera view to a second direction of the line of sight with respect to the display in the map view, wherein the first direction of the line of sight with respect to the display is different than the second direction of the line of sight with respect to the display; and a display connected to the memory, wherein the display is configured to display the second frame having the map view on the display.

16. The mobile platform of claim 15, further comprising a wireless transceiver, wherein a digital map displayed in the map view is obtained using the wireless transceiver.

17. The mobile platform of claim 15, further comprising:
wherein the first frame includes a third augmentation overlay graphic element being displayed in response to receiving the request to transition, the third augmentation overlay graphic element highlighting a visibly identifiable environmental characteristic in the camera view;

wherein the second frame includes a fourth augmentation overlay graphic element highlighting the visibly identifiable environmental characteristic in the map view;

wherein the intermediate frame includes an additional intermediate augmentation overlay graphic element highlighting the visibly identifiable environmental characteristic, the additional intermediate augmentation overlay graphic element providing a visual connection between the third augmentation overlay graphic element and the fourth augmentation overlay graphic element; and wherein the third augmentation overlay graphic element, the additional intermediate augmentation overlay graphic element, and the fourth augmentation overlay graphic element show a change in a first position of the visibly identifiable environmental characteristic with respect to the display in the camera view to a second position of the visibly identifiable environmental characteristic with respect to the display in the map view.

18. The mobile platform of claim 17, wherein the software further causes the processor to:
identify the visibly identifiable environmental characteristic in the camera view;
identify the same visibly identifiable environmental characteristic in the map view;
prepare the third augmentation overlay graphic element for the visibly identifiable environmental characteristic in the camera view;
prepare the fourth augmentation overlay graphic element for the visibly identifiable environmental characteristic in the map view;
prepare the additional intermediate augmentation overlay graphic element that provides the visual connection between the third augmentation overlay graphic element and the fourth augmentation overlay graphic element;
display the third augmentation overlay graphic element for the camera view in the first frame;
display the additional intermediate augmentation overlay graphic element in the intermediate frame; and
display the fourth augmentation overlay graphic element for the map view in the second frame.

19. The mobile platform of claim 18, wherein the identified visibly identifiable environmental characteristic is at least one or more of a line, geometric shape, an area, building, and a color mass.

20. The mobile platform of claim 18, wherein the third augmentation overlay graphic element and the fourth augmentation overlay graphic element for the visibly identifiable environmental characteristic are at least one or more of a line, geometric shape, an area, a color, an outline, a cropped image of the visibly identifiable environmental characteristic, and are at least one or more of opaque, transparent, two-dimensional, three-dimensional.

21. The mobile platform of claim 15, wherein producing and displaying the user interface transition comprises producing and displaying a change in at least one or more of a position, orientation, shape and perspective between the first augmentation overlay graphic element and the second augmentation overlay graphic element with the intermediate augmentation overlay graphic element.

22. The mobile platform of claim 15, wherein the software causes the processor to detect a request for the transition based on a gesture detected by the one or more orientation sensors.

23. The mobile platform of claim 15, wherein the software causes the processor to show a location of a user in the map view.

24. The mobile platform of claim 15, wherein the map view is at least one or more of a two-dimensional map representation, a three-dimensional map representation, a three-dimensional top view, and a satellite image view.

25. The mobile platform of claim 15, wherein a direction of a field of view of the camera is identified by a direction of the line of sight with respect to the map view.

26. An apparatus for providing a user interface transition, the apparatus comprising:
means for displaying a camera view on a display of a device, the camera view including an image captured by a camera on the device;
means for receiving a request to transition from the camera view to a map view on the display;
means for producing and displaying the user interface transition on the display, the user interface transition comprising multiple frames including a first frame having the camera view, a second frame having the map view, and an intermediate frame,
  wherein the first frame includes a first augmentation overlay graphic element being displayed in response to receiving the request to transition, the first augmentation overlay graphic element being overlaid over the captured image in the camera view and identifying a line of sight from the perspective of the camera relative to the image in the camera view,
  wherein the second frame includes a second augmentation overlay graphic element identifying the line of sight in the map view,
  wherein the intermediate frame is displayed between the first frame and the second frame to provide a visual connection between the first augmentation overlay graphic element and the second augmentation overlay graphic element, the intermediate frame including an intermediate augmentation overlay graphic element, and
  wherein the first augmentation overlay graphic element, the intermediate augmentation overlay graphic element, and the second augmentation overlay graphic element show a change in a first direction of the line of sight with respect to the display in the camera view to a second direction of the line of sight with respect to the display in the map view, wherein the first direction of the line of sight with respect to the display is different than the second direction of the line of sight with respect to the display; and
means for displaying the second frame having the map view on the display.

27. The apparatus of claim 26, further comprising;
wherein the first frame includes a third augmentation overlay graphic element being displayed in response to receiving the request to transition, the third augmentation overlay graphic element highlighting a visibly identifiable environmental characteristic in the camera view;
wherein the second frame includes a fourth augmentation overlay graphic element highlighting the visibly identifiable environmental characteristic in the map view;
wherein the intermediate frame includes an additional intermediate augmentation overlay graphic element highlighting the visibly identifiable environmental characteristic, the additional intermediate augmentation overlay graphic element providing a visual connection between the third augmentation overlay graphic element and the fourth augmentation overlay graphic element; and
wherein the third augmentation overlay graphic element, the additional intermediate augmentation overlay graphic element, and the fourth augmentation overlay graphic element show a change in a first position of the visibly identifiable environmental characteristic with respect to the display in the camera view to a second position of the visibly identifiable environmental characteristic with respect to the display in the map view.

28. The apparatus of claim 27, further comprising:
means for identifying the visibly identifiable environmental characteristic in the camera view and the same visibly identifiable environmental characteristic in the map view, wherein the means for producing and displaying the user interface transition comprises means for preparing the third augmentation overlay graphic element for the visibly identifiable environmental characteristic in the camera view, the fourth augmentation overlay graphic element for the visibly identifiable environmental characteristic in the map view, and the additional intermediate augmentation overlay graphic element that provides the visual connection between the third augmentation overlay graphic element and the fourth augmentation overlay graphic element.

29. The apparatus of claim 28, wherein the identified visibly identifiable environmental characteristic is at least one or more of a line, geometric shape, an area, building, and a color mass.

30. The apparatus of claim 26, wherein producing and displaying the user interface transition comprises producing and displaying a change in at least one or more of a position, orientation, shape and perspective between the first augmentation overlay graphic element and the second augmentation overlay graphic element with the intermediate augmentation overlay graphic element.

31. The apparatus of claim 26, further comprising:
a wireless transceiver for obtaining a digital map to display as the map view.

32. The apparatus of claim 26, wherein the map view is at least one or more of a two-dimensional map representation, a three-dimensional map representation, a three-dimensional top view, and a satellite image view.

33. The apparatus of claim 26, wherein a direction of a field of view of the camera that generates the camera view is identified by a direction of the line of sight with respect to the map view.

34. A non-transitory computer-readable medium including program code stored thereon, comprising:
  program code to display a camera view on a display of a device, the camera view including an image captured by a camera on the device;
  program code to receive a request to transition from the camera view to a map view on the display;
  program code to produce and display a user interface transition on the display, the user interface transition comprising multiple frames including a first frame having the camera view, a second frame having the map view, and an intermediate frame,
    wherein the first frame includes a first augmentation overlay graphic element being displayed in response to receiving the request to transition, the first augmentation overlay graphic element being overlaid over the captured image in the camera view and identifying a line of sight from the perspective of the camera relative to the image in the camera view,
    wherein the second frame includes a second augmentation overlay graphic element identifying the line of sight in the map view,
    wherein the intermediate frame is displayed between the first frame and the second frame to provide a visual connection between the first augmentation overlay graphic element and the second augmentation overlay graphic element, the intermediate frame including an intermediate augmentation overlay graphic element, and
    wherein the first augmentation overlay graphic element, the intermediate augmentation overlay graphic element, and the second augmentation overlay graphic element show a change in a first direction of the line of sight with respect to the display in the camera view to a second direction of the line of sight with respect to the display in the map view, wherein the first direction of the line of sight with respect to the display is different than the second direction of the line of sight with respect to the display; and
program code to display the second frame having the
map view on the display.

35. The non-transitory computer-readable medium of claim 34, further comprising:
program code to identify a visibly identifiable environmental characteristic in the camera view;
program code to identify the same visibly identifiable environmental characteristic in the map view; and
program code to generate a third augmentation overlay graphic element for the visibly identifiable environmental characteristic in the camera view, a fourth augmentation overlay graphic element for the visibly identifiable environmental characteristic in the map view, and an additional intermediate augmentation overlay graphic element, wherein the third augmentation overlay graphic element, the additional intermediate augmentation overlay graphic element, and the fourth augmentation overlay graphic element show a change in a first position of the visibly identifiable environmental characteristic with respect to the display in the camera view to a second position of the visibly identifiable environmental characteristic with respect to the display in the map view.

36. The non-transitory computer-readable medium of claim 34, wherein a direction of a field of view of the camera is identified by a direction of the line of sight with respect to the map view.

* * * * *